United States Patent
Neil (10) Patent No.: US 9,239,449 B2
(45) Date of Patent: Jan. 19, 2016

(54) ANAMORPHIC OBJECTIVE ZOOM LENS

(71) Applicant: Cooke Optics Ltd., Thurmaston, Leicester (GB)

(72) Inventor: Iain A. Neil, Canobbio (CH)

(73) Assignee: COOKE OPTICS LTD., Thurmaston, Leicester (GB)

( * ) Notice: Subject to any disclaimer, the term of this patent is extended or adjusted under 35 U.S.C. 154(b) by 0 days.

(21) Appl. No.: 14/683,297

(22) Filed: Apr. 10, 2015

(65) Prior Publication Data

US 2015/0212301 A1    Jul. 30, 2015

Related U.S. Application Data

(63) Continuation-in-part of application No. 14/218,064, filed on Mar. 18, 2014.

(60) Provisional application No. 61/808,343, filed on Apr. 4, 2013.

(51) Int. Cl.

| | |
|---|---|
| *G02B 15/14* | (2006.01) |
| *G02B 13/08* | (2006.01) |
| *G02B 13/12* | (2006.01) |
| *G02B 13/18* | (2006.01) |
| *G02B 27/00* | (2006.01) |
| *G02B 13/04* | (2006.01) |
| *G02B 13/00* | (2006.01) |
| *G02B 15/16* | (2006.01) |
| *G02B 15/20* | (2006.01) |
| *G02B 15/177* | (2006.01) |

(52) U.S. Cl.
CPC ............ *G02B 13/12* (2013.01); *G02B 13/08* (2013.01); *G02B 13/18* (2013.01); *G02B 27/0025* (2013.01); *G02B 13/002* (2013.01); *G02B 13/009* (2013.01); *G02B 13/0045* (2013.01); *G02B 13/04* (2013.01); *G02B 15/14* (2013.01); *G02B 15/16* (2013.01); *G02B 15/177* (2013.01); *G02B 15/20* (2013.01)

(58) Field of Classification Search
CPC .... G02B 15/177; G02B 13/009; G02B 13/18; G02B 15/14; G02B 13/0045; G02B 13/04; G02B 15/16; G02B 15/20; G02B 27/0025; G02B 13/002; G02B 13/08
USPC ......... 359/664, 668, 670, 671, 738–740, 753, 359/784
See application file for complete search history.

(56) References Cited

U.S. PATENT DOCUMENTS

| | | | | |
|---|---|---|---|---|
| 3,990,785 | A | * | 11/1976 | Hirose ..................... 359/670 |
| 5,668,666 | A | * | 9/1997 | Suzuki ..................... 359/674 |
| 5,745,298 | A | * | 4/1998 | Yahagi ..................... 359/683 |

(Continued)

*Primary Examiner* — Evelyn A Lester (74) *Attorney, Agent, or Firm* — Epstein Drangel LLP; Robert L. Epstein (57) ABSTRACT

The anamorphic objective zoom lens includes, along an optical axis and in order from an object space to an image space: at least a negative (−) power spherical first lens group; an anamorphic second lens group, spherical third lens group preferably having positive (+) power, a variable power spherical fourth lens group and a positive (+) power spherical fifth lens group. The aperture stop is located before, after or preferably within the spherical fifth lens group. All spherical lens groups contain spherical and plano refractive optical surfaces. The anamorphic second lens group contains cylindrical and plano optical surfaces with at least one cylindrical surface oriented at substantially 90 degrees about at least one other cylindrical surface. The spherical first lens group may provide focusing. The variable power spherical fourth lens group provides zooming.

30 Claims, 3 Drawing Sheets

(56) References Cited

U.S. PATENT DOCUMENTS

| | | |
|---|---|---|
| 6,112,111 A | 8/2000 | Glantz |
| 6,995,920 B2 * | 2/2006 | Nurishi ........................ 359/668 |
| 7,085,066 B2 * | 8/2006 | Neil .............................. 359/668 |
| 7,113,344 B2 * | 9/2006 | Nurishi et al. ................ 359/668 |
| 7,123,421 B1 | 10/2006 | Moskovich et al. |
| 8,662,679 B2 * | 3/2014 | Otani et al. ................... 359/740 |

* cited by examiner

ANAMORPHIC OBJECTIVE ZOOM LENS

CROSS-REFERENCE TO RELATED APPLICATIONS

This application is a continuation in part of copending application Ser. No. 14/218,064, filed Mar. 18, 2014, which application claims the benefit under 37 CFR §119(e) of U.S. Provisional Application No. 61/808,343 filed Apr. 4, 2013, the contents of which are incorporated herein their entirety.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to anamorphic objective zoom lenses, and more particularly to a range of different focal length anamorphic objective zoom lenses with zoom ratios that provide imaging over wide to narrow fields of view and provide traditional anamorphic imaging characteristics, and potentially compact diameter by having an arrangement of five lens groups with spherical, anamorphic and spherical powers, in which one of the spherical lens groups following the anamorphic lens group has variable power and an optical stop located inside the last spherical lens group.

2. Description of Prior Art Including Information Disclosed Under 37 CFR 1.97 and 1.98

Contemporary anamorphic objective zoom lenses normally have an optical axis and are commonly based on a rear anamorphic lens group or a front anamorphic lens group. Anamorphic objective zoom lenses having a rear anamorphic lens group are typically more commonplace than anamorphic objective zoom lenses having a front anamorphic lens group.

Anamorphic objective zoom lenses having a rear anamorphic lens group have a rear lens group with Y cylinder refractive optical surfaces and a front spherical lens group with an optical stop in the front spherical lens group in the form of a variable aperture diameter iris or diaphragm.

This anamorphic objective zoom lens arrangement produces images having spherical out of focus objects commonly referred to as the bokeh as compared to the oval or elliptically shaped out of focus objects produced by fixed focal length (commonly referred to as prime) anamorphic objective lenses. The oval or elliptically shaped bokeh of out of focus objects are desired by cinematographers because they produce a distinctive artistic look that is different from spherical objective lenses. Another common drawback with this anamorphic objective zoom lens arrangement is that the full aperture may be relatively slow as compared to that of anamorphic prime lenses.

Anamorphic objective zoom lenses having a front anamorphic lens group have a front lens group with X cylinder refractive optical surfaces and a rear spherical lens group with an optical stop in the rear spherical lens group in the form of a variable aperture diameter iris or diaphragm.

This anamorphic objective zoom lens arrangement produces images having oval or elliptically shaped out of focus objects commonly referred to as the bokeh which is desired by cinematographers for the reasons previously given however these lenses normally provide only small zoom ratios of 2× or 3×, where the smaller zoom ratio provides the widest field of view, and they tend be large in diameter with corresponding potentially higher weight and cost. They may also exhibit some breathing when focusing where the breathing is characterized by the field of view or focal length of the lens changing size as the lens is focused from distant to close objects or vice versa. Nevertheless the front anamorphic objective zoom lens arrangements produce images having numerous residual optical aberrations and characteristics most of which are desired by cinematographers because they produce an artistic look that is different from spherical objective lenses.

Many of the less desired residual optical aberrations and characteristics of these front and rear anamorphic objective zoom lens arrangements were accepted by cinematographers with film based cameras but with the advent and adoption of electronic sensor based digital cameras some of them have become less acceptable. In particular the amount of residual chromatic aberration has become less tolerable whereas some field curvature combined with some residual astigmatism is still acceptable.

As well as the oval or elliptically shaped bokeh another characteristic that is desired because of the distinctive artistic look produced is the depth of field being different in the vertical azimuth direction of the field versus the horizontal azimuth direction of the field. In the case of an anamorphic objective zoom lens that squeezes the horizontal field of view by substantially two times as compared to the vertical field of view, the depth of field in the horizontal azimuth direction of the field is substantially two times greater than the depth of field in the vertical azimuth direction of the field.

Improving the optical aberrations and characteristics of anamorphic objective zoom lenses of this arrangement may involve increasing optical surface shape complexity and hence manufacturing cost including adding aspherical and free-form shaped optical surfaces.

Thus, to address the artistic need of cinematographers and maximize the imaging potential of both film and digital cameras a compact diameter anamorphic objective zoom lens arrangement that provides a useful zoom range going from wide to narrow fields of view during zooming with a suitable blend of residual optical aberration correction and characteristics needs to be achieved.

BRIEF SUMMARY OF THE INVENTION

The present invention relates to an anamorphic objective zoom lens including, along an optical axis and in order from an object space to an image space, at least a negative (−) power spherical first lens group; an anamorphic second lens group, a spherical third lens group preferably having a positive (+) power, a variable power spherical zoom fourth lens group and a positive (+) power spherical fifth lens group wherein an aperture stop is located before, after or preferably within the spherical fifth power lens group. The anamorphic second lens group has at least one cylindrical surface in a first direction and at least one other cylindrical surface in a substantially perpendicular direction to the first direction to enable a high degree of aberration correction over the whole image, whereby the residual longitudinal chromatic aberration and the residual lateral chromatic aberration are substantially reduced. The variable power spherical fourth lens group has at least two lens sub groups that are axially movable to provide zooming. The negative power spherical first lens group may provide focusing by movement of at least one of the lens elements contained therein and may exhibit low breathing in the focus range. The lens is a complete assembly that forms a real image.

The anamorphic second lens group provides a squeeze of the field of view so that the focal lengths in the X and Y directions are different by a ratio of about two times which is typical for traditional anamorphic optical systems. The positive power spherical fifth lens group adjacent the image space delivers the radiation passing through the optical system on to the image sensor with nearly telecentric light paths and suitably high relative illumination, thereby increasing the efficiency of many electronic sensors.

The variable power spherical zoom fourth lens group which provides zooming uses at least two axially movable lens sub groups. The variable power spherical zoom fourth lens group is located between object space and the optical stop thus providing a substantially near constant aperture through zoom.

In accordance with one aspect of the present invention, an anamorphic objective zoom lens is provided including, along an optical axis and in order from an object space to an image space, a negative (−) power spherical first lens group; an anamorphic second lens group, a spherical third lens group preferably having a positive (+) power, a variable power spherical zoom fourth lens group and a positive (+) power spherical fifth lens group and an aperture stop. The aperture stop is located in a position either before, after and within the spherical fifth lens group.

Preferably, the aperture stop is located within the positive (+) power spherical fifth lens group.

The negative (−) power spherical first lens group is configured to provide focusing.

The anamorphic objective zoom lens has an optical axis. The first, second, third, fourth and fifth lens groups are situated along the optical axis. The anamorphic objective zoom lens is adapted for use between an object space and an image space. The optical axis extends between the object space and the image space.

The fifth lens group has at least one cylindrical surface in a first direction and at least one cylindrical surface in a direction substantially perpendicular to the first direction.

The fifth lens group has focal lengths in the X and Y directions which differ and together with the other lens group focal lengths produce focal lengths in X and Y directions which differ by a ratio of about two times.

The anamorphic objective zoom lens preferably has a focal length within the range of from at least 35 mm to 140 mm and preferably 40 mm to 125 mm in the Y direction.

The anamorphic objective zoom lens provides low residual chromatic aberration, a traditional oval bokeh shape, and different depths of field in the vertical and horizontal azimuth directions of the field.

The anamorphic objective zoom lens has a medium fast full aperture, moderately wide angle field of view to a moderately narrow angle field of view throughout its zoom lens range.

The lens groups of the anamorphic objective zoom lens are fabricated of lens elements made of glass.

The spherical lens groups include a lens element with a rotationally symmetrical surface shape about the optical axis.

The lens group with anamorphic powers includes a lens element with a non-rotationally symmetrical surface about the optical axis.

The anamorphic objective zoom lens preferably operates at an aperture of f/3.1 and over a waveband of 455-656 nm.

The anamorphic second lens group has seven cylindrically surfaced lens elements with eight Y cylinders, five X cylinders and one plano surface shapes.

The spherical first lens group includes five lens elements, three of which are axially moveable relative to the other.

The spherical third lens group includes four lens elements.

The spherical zoom fourth lens group includes five lens elements, three of which form a first zoom sub group and two of which form a second zoom sub group, both of which are axially movable.

The spherical fifth lens group includes nine lens elements.

BRIEF DESCRIPTION OF THE SEVERAL VIEWS OF DRAWINGS

To these and to such other objects that may hereinafter appear, the present invention relates to an anamorphic objective zoom lens as described in detail in the following specification and recited in the annexed claims, taken together with the accompanying drawings, in which like numerals refer to like parts and in which:

DETAILED DESCRIPTION OF THE INVENTION

The invention relates to anamorphic objective zoom lenses, and in particular to a range of different focal length anamorphic objective zoom lenses covering at least a focal length range from 35 mm to 140 mm and preferably 40 mm to 125 mm in the Y direction and providing low residual chromatic aberration, a traditional oval bokeh shape and different depths of field in the vertical and horizontal azimuth directions of the field.

The term "lens group" as used in connection with the anamorphic objective zoom lens disclosed herein means one or more individual lens elements. Also, the terms "optical stop" and "stop" are equivalent terms that can be used interchangeably.

The example provided herein is a preferred embodiment of the invention in which the first (front) lens group is negatively powered, the third lens group is positively powered, the fourth lens group is variable powered and the last (rear) lens group is positively powered. Those lens groups are paired with an anamorphic second lens group to work in unison and match the preferred optical interface characteristics of sensors, where near telecentric radiation beams approach the sensor.

The preferred embodiment discussed below is a medium fast full aperture moderately wide angle field of view to moderately narrow angle field of view anamorphic objective lens of the zoom.

In the preferred embodiment, all of the lens elements are made from glasses. The lens element optical surface shapes in the first, third, fourth and fifth spherical lens groups are all rotationally symmetrical about the optical axis such as spherical and in the anamorphic second lens group at least one lens element surface shape is non-rotationally symmetrical about the optical axis such as cylindrical.

In addition to providing these kinds of features and others like low breathing and (near) telecentric radiation output at the sensor, the preferred embodiment is capable of achieving suitable levels of various performance including image quality resolution and contrast (usually measured as MTF), high relative illumination for low shading and efficient optical throughput at the sensor via near telecentric radiation output at the sensor, which telecentric radiation output is less than 10 degrees.

Figure 1:
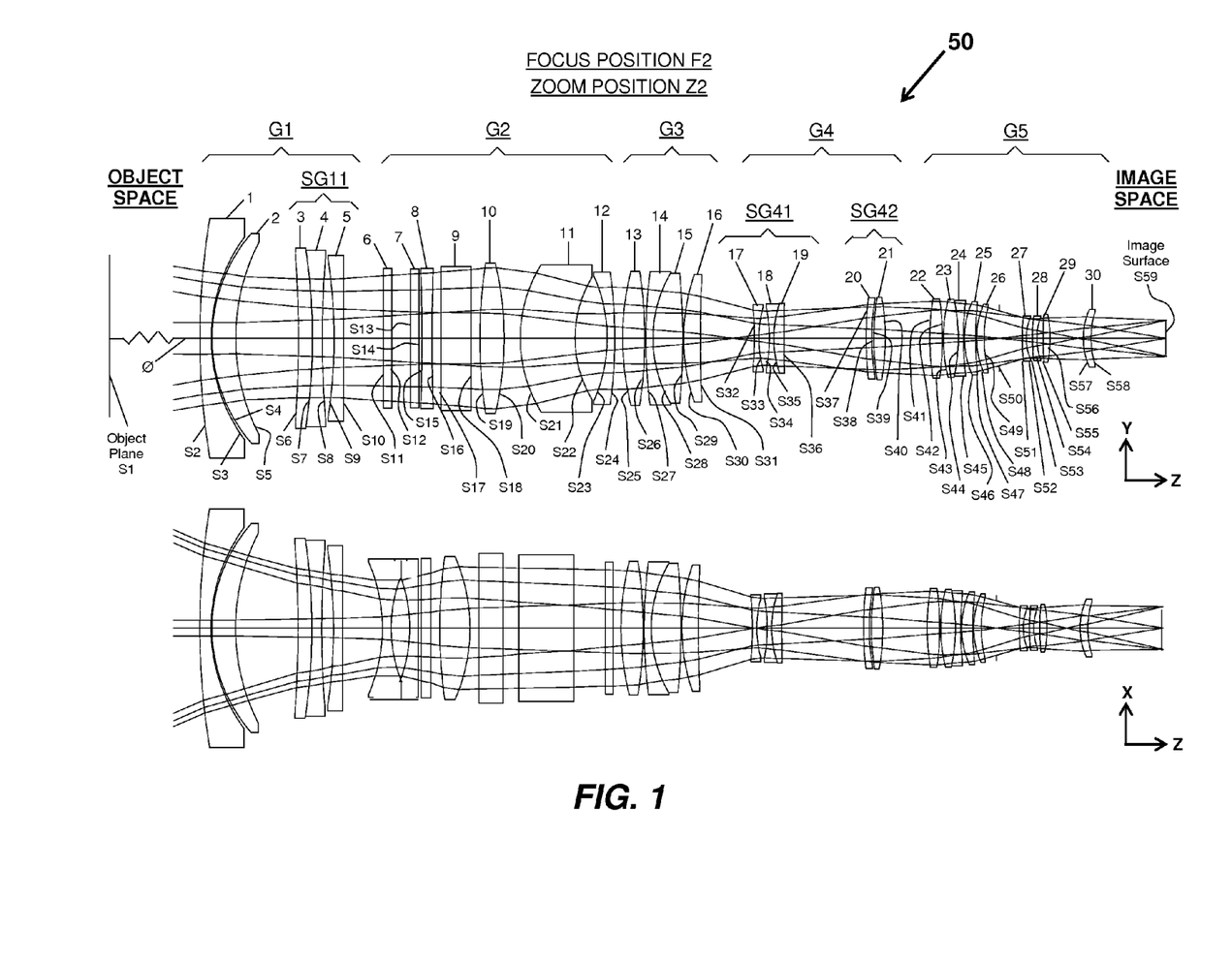
FIG. 1 is a lens plot in the YZ elevation (side view) and XZ elevation (plan view) on an optical axis Ø where the Y direction focal length is 51.00 mm and the X direction focal length is 26.21 mm. In the YZ elevation, three fields are shown at zero, top and bottom of the field of view. In the XZ elevation, three fields are shown at zero and both sides of the field of view. In the YZ elevation and in the XZ elevation diagrams an intermediate focus distance arrangement is shown.

The preferred embodiment of the present invention will now be described by way of a design example with accompanying figures and tables. Referring first to FIG. 1, each lens element is identified by a numeral from 1 through 30 and the general configuration of each lens element is depicted, but the actual radius of each lens surface is set forth below in a table. The lens surfaces are identified by the letter "S" followed by a numeral from S1 through S58.

Each lens element has its opposite surfaces identified by a separate but consecutive surface number as, for example, lens element 1 has lens surfaces S2 and S3, lens element 11 has lens surfaces S21 and S22 and so forth, as shown in FIG. 1, except that for doublet lens element pairs 3, 4 and 14, 15 and 18, 19 and 23, 24 the coincident facing lens surfaces are given a single surface number. For example, doublet lens element pair 3, 4 is comprised of lens element 3 having a front lens surface S6 and a rear lens surface S7 and lens element 4 having a front lens surface S7 (coincidental) and a rear lens surface S8. The location of the object to be photographed, particularly as it relates to focus distance, is identified by a vertical line and numeral "S1" on the optical axis, and the real image surface is identified by the numeral S59. All of the spherical lens surfaces have a finite radius of curvature except S10 which is plano and all the cylindrically surfaced lens elements have a finite radius of curvature in X or Y directions except for S14 which is plano.

Before describing the detailed characteristics of the lens elements, a broad description of the lens groups and their axial positions and movement will be given for the anamorphic objective zoom lens system of the present invention, generally designated 50. Beginning from the end facing the object S1 to be photographed, i.e. the left end in FIG. 1, the spherical first lens group G1 comprises lens elements 1 and 2 and a lens sub group SG11 comprised of lens elements 3, 4 and 5. The anamorphic second lens group G2 comprises lens elements 6, 7, 8, 9, 10, 11 and 12. The spherical third lens group G3 includes lens elements 13, 14, 15 and 16. The variable power spherical zoom fourth lens group G4 includes, from left to right in FIG. 1, lens sub group SG41 including lens elements 17, 18, and 19, and lens sub group SG42 including lens elements 20 and 21. The spherical fifth lens group G5 closest to the image space includes lens elements 22, 23, 24, 25, 26, 27, 28, 29 and 30.

Figure 2:
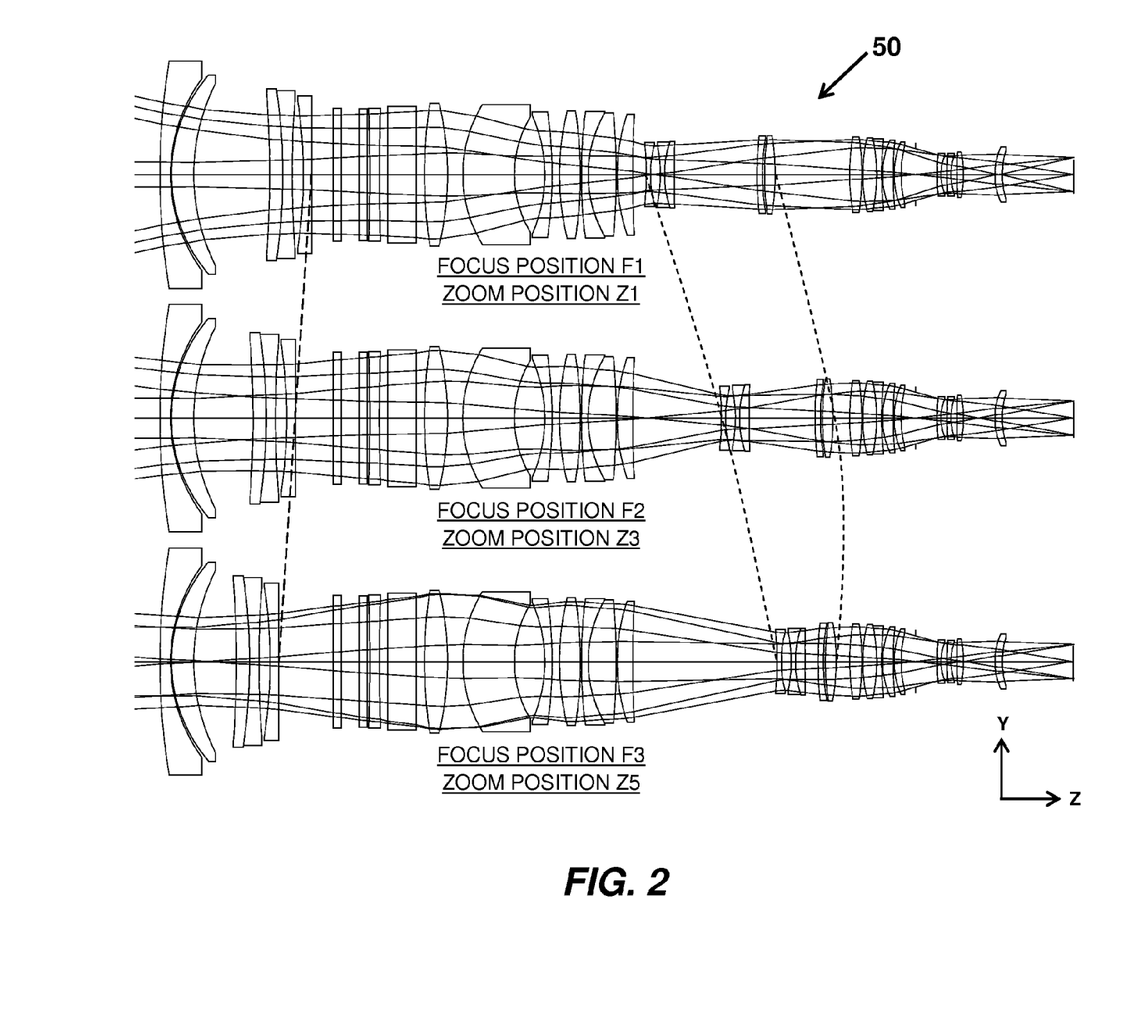
FIG. 2 is a lens plot in the YZ elevation (side view) on an optical axis Ø where the Y direction focal lengths are 40.01 mm, 67.98 mm and 125.01 mm with three fields shown at zero, top and bottom of the field of view and the top to bottom diagrams showing far, intermediate and close focus distance arrangements.

The images of FIG. 2 illustrate in the Y direction the movement of lens sub group G11 in both directions along the optical axis for focusing at three focus positions and the movement of lens sub groups SG41 and SG42 in both directions along the optical axis for zooming at three positions.

Figure 3:
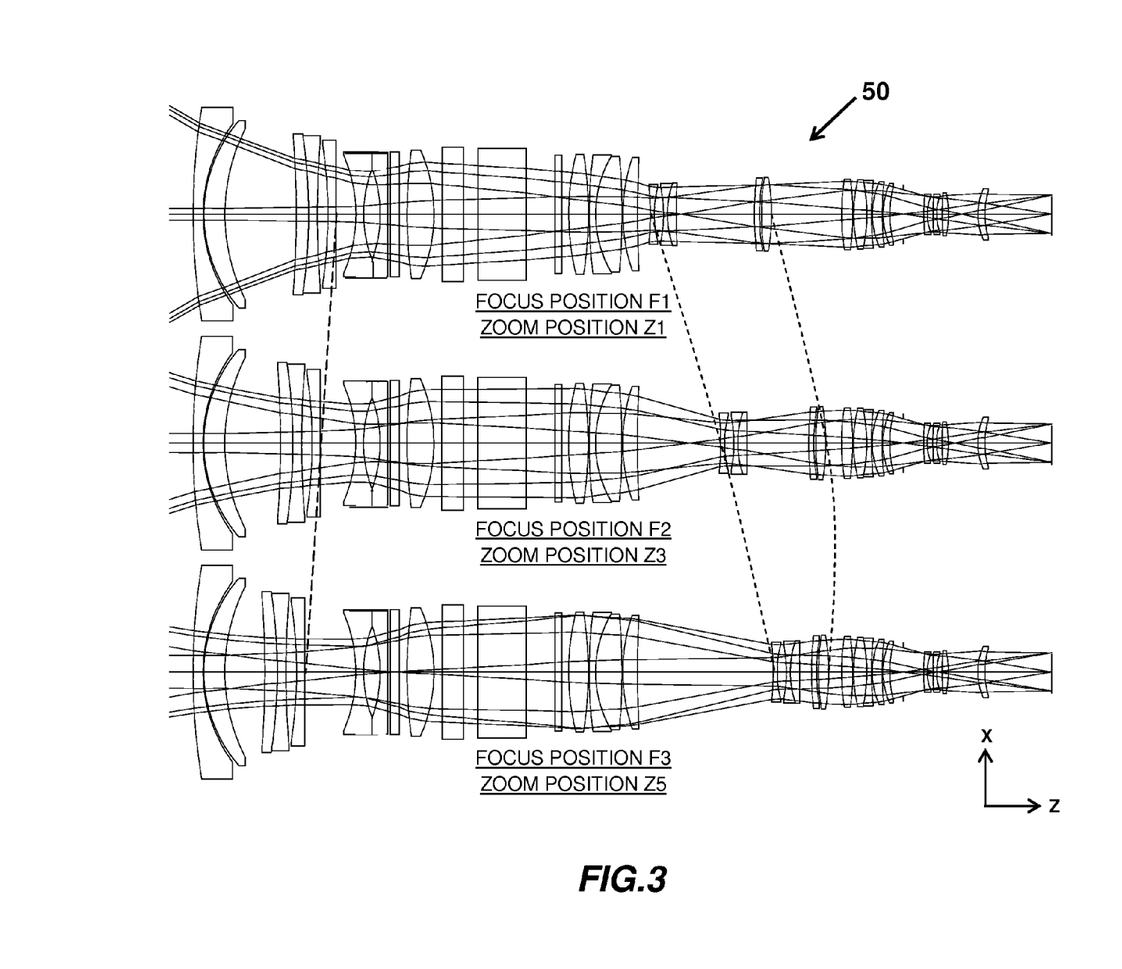
FIG. 3 is a lens plot in the XZ elevation (plan view) on an optical axis Ø where the X direction focal length are 20.57 mm, 34.94 mm and 64.27 mm with three fields shown at zero and both sides of the field of view and the top to bottom diagrams showing far, intermediate and close focus distance arrangements.

The images of FIG. 3 illustrate in the X direction the movement of lens sub group G11 in both directions along the optical axis for focusing at three focus positions and the movement of lens sub groups SG41 and SG42 in both directions along the optical axis for zooming at three positions.

In FIGS. 2 and 3 the auxiliary lens fifth group G5 remains stationary and at a fixed distance from the real image surface S59.

While only the lens elements are physically shown in FIG. 1, it is to be understood that conventional mechanical devices and mechanisms are provided for supporting the lens elements and for causing axial movement of the movable lens groups in a conventional lens housing or barrel.

The Optical Prescription data for the above described anamorphic zoom lens system 50 is set forth below in TABLE 1, which is extracted from data produced by CODE V® optical design software that is commercially available from Synopsis Optical Research Associates, Inc., Pasadena, Calif., U.S.A., which was also used for producing the optical diagrams. All of the data in TABLE 1 is given at a temperature of 25° C. (77° F.) and standard atmospheric pressure (760 mm Hg).

Throughout this specification, including the Tables, all measurements are in millimeters (mm) or as otherwise shown. In TABLE 1, the first column "ITEM" identifies each optical element and each location, i.e. object plane, etc., with the same numeral or label as used in FIG. 1. The second and third columns identify the "Group" and "Subgroup", respectively, to which that optical element (lens) belongs with the same numerals used in FIG. 1. The fourth column "Surface" is a list of the surface numbers and the fifth column "Shape" is the surface shape.

The sixth and seventh columns "Focus Position" and "Zoom Position", respectively, identify the typical focus positions of the spherical lens group and the typical positions of the lens elements in the variable power spherical zoom fourth lens group wherein there are changes in the distance (separation) between some of the surfaces listed in the "Separation" column which is the axial distance between that surface (fourth column) and the next surface, for example, the distance between surface S2 to surface S3 is 5.579 mm.

The columns headed by the legends "Y Radius of Curvature" and "X Radius of Curvature" list the optical surface radius of curvature for each surface in the Y and X plane, respectively, with a minus sign (−) meaning the center of the radius of curvature is to the left of the surface, as viewed in FIG. 1, and "Flat" meaning an optically flat surface described as "Plano" in column 5.

The next four columns, 11 to 14, of TABLE 1 relate to the "Material" between that surface and the next surface to the right in FIG. 1, with the eleventh column "Type" indicating whether there is a lens (Glass) or empty space (Air) between those two surfaces. All of the lenses are glass and the column titled "Code" identities the optical glass. The column marked "Supplier" identifies the source of the lens and the column marked "Name" lists the Supplier's identification for each glass type, but it is to be understood that any equivalent or adequate glass may be used.

The last column of TABLE 1 headed "Aperture Half Diameter" provides the maximum aperture half diameter for each surface through which the light rays pass.

The novel configuration of having a negatively powered spherical first lens group, an anamorphic second lens group followed by a spherical third lens group preferably with a positive power, a variable power spherical fourth lens group and a positively powered spherical fifth lens group containing an optical stop may produce some residual distortion, astigmatism and field curvature aberrations but those aberrations to a tolerable extent contribute to the anamorphic look as desired by many cinematographers. In addition, a balanced blend of the afore-described lens characteristics may aid in cost reduction of manufacture. With the advent and adoption of digital cameras employing electronic sensors a large back focal length which was once required for film cameras having a reflex mirror may be less necessary but is still provided for in the novel anamorphic objective zoom lens.

The preferred embodiment operates at an aperture of f/3.1 and over a waveband of 455-656 nm and this waveband is what was used in the MTF Table 3. A faster or slower aperture may be required and an extended waveband may be required. The aperture may be increased or reduced and the waveband expanded and the optical designs re-optimized to maximize image quality over such apertures and wavebands without departing from the invention. Also, during such re-optimization alternate glass types may be used without departing from the spirit and scope of the disclosure. Furthermore, more complex optical surface shapes such as aspherical and free-form surfaces may be introduced for expanded performance but at the likely effect of increased manufacturing cost.

Referring to FIGS. 1-3, those figures relate to the preferred embodiment in which the focal length in the Y directions are 40.01 mm, 67.98 mm and 125.01 mm and in the X directions are 20.57 mm, 34.94 mm and 64.27 mm. The overall length is 477 mm from the first refractive surface vertex of the lens to the image surface vertex, the front diameter clear aperture is 114.00 mm, the back focal length from the rear refractive surface vertex to the image vertex is 37.17 mm and the close focus distance from the object to the image is 1165 mm. The focal lengths of the spherical first lens group are −116.86 mm, −118.72 mm and −120.67 mm for the far, intermediate and close focus distances. The focal lengths of the anamorphic second lens group are +306.23 mm in the Y direction and −284.96 mm in the X direction. The focal length of the spherical third lens group is 107.33 mm. The focal lengths of the spherical fourth lens group with zooming are −90.88 mm, −100.10 mm and −70.74 mm for the short, medium and long focal length positions. The focal length of the spherical fifth lens group is 86.52 mm. The focal lengths of the focusing sub group and the zooming sub groups respectively are −265.40 mm, −46.15 mm and 190.83 mm.

FIGS. 2 and 3 show the locus of axial movement of the focusing sub group with a long dashed curve and the locus of axial movements of the zooming sub groups with short dashed curves where the closest approach of the zooming sub group nearest image space to the adjacent stationary lens element lies between zoom positions three (Z3) and five (Z5), of which the axial airspace distance of closest approach is given approximately by the data for zoom position Z4 in Table 1 which accompanies this specification.

The focal lengths of the seven anamorphic lens elements containing at least one cylindrical surface are in order from an object space to an image space −75.75 mm (in X direction), −150.63 mm (in X direction), −561.89 mm (in Y direction), 87.29 mm (in X direction), 141.59 mm (in Y direction), −3906.70 mm (in Y direction) and −230.05 mm (in Y direction). It is to be understood that the focal lengths of the seven anamorphic lens elements in the other X and Y directions are substantially large and hence have little optical power.

In the preferred embodiment the lens system includes a total of thirty lens elements with twenty two singlets and four doublets. The spherical first lens group contains five lens elements with three elements axially movable for focusing at different distances, the anamorphic second lens group contains seven cylindrically surfaced lens elements with eight Y cylinders, five X cylinders and one plano surface shape, the spherical second group contains four lens elements, the zoom fourth lens group contains five lens elements which form two axially movable sub groups for zooming with three lens elements and two lens elements. The optical stop lies within the spherical fifth lens group. The nominal image size is 8.91 mm vertical half height and 10.65 mm horizontal half width in image space. In this example embodiment the telecentric radiation output is about 9.1 degrees at all three focus positions and over the zoom range.

The accompanying Optical Prescription Table 1 describes a select example of the preferred embodiment of the anamorphic objective zoom lens disclosed herein.

Table 2 which accompanies this specification contains focal length, anamorphic squeeze, illumination and breathing data of the preferred embodiment. In Table 2 it is shown that the anamorphic squeeze ratio is within a small range of about 1.95% to 2.03%. In Table 2 it is also shown that the relative illumination is above 30%, which is sufficiently high for low shading at the corner of the field of view when an anamorphic objective zoom lens is used in combination with an electronic sensor at the image plane, such as when the anamorphic objective zoom lens constitutes part of a digital camera. In Table 2 it is further shown that the focus breathing is consistently very small through focusing and zooming.

In Table 3 which accompanies the specification, the polychromatic MTF performance at a spatial frequency of 20 cycles/mm is shown for the example embodiment to be greater than 50% at all field positions at the given combination of far, intermediate and close focus distances and short, medium and long focal lengths.

The seven anamorphic lens elements with the cylindrical surfaces of the example embodiment additionally may each have two refractive surfaces which may be formed by X and Y cylindrical surfaces or Y and X cylindrical surfaces with the X and Y surfaces substantially perpendicular to one another. This arrangement may improve the imaging characteristics but likely at the effect of additional manufacturing cost.

Although the present invention has been fully described in connection with a preferred embodiment thereof with reference to the accompanying drawings and data tables, various changes and modifications could be made thereto, including smaller and larger zoom ranges, smaller and larger focal lengths, smaller and larger anamorphic squeeze ratios, smaller and larger full aperture f/numbers, smaller and larger image sizes, smaller and larger wavebands, etc. (e.g., 435 nm to 656 nm), as will be apparent to those skilled in the art. Such changes and modifications are to be understood as being included within the scope of the present invention as defined by the appended claims.

TABLE 1

Optical Prescription

| Item | Sub-Group | Group | Surface No. | Shape[1] | Focus Position | Zoom Position[2,3] | Separation (mm) | Y Radius of Curvature (mm) | X Radius of Curvature (mm) | Type | Code | Name[4] | Supplier[5] | Aperture[6] Half Diameter (mm) |
|---|---|---|---|---|---|---|---|---|---|---|---|---|---|---|
| Object Plane | | | S1 | Plano | F1 | All | 999999.000 | Flat | Flat | Air | | | | |
| | | | | | F2 | All | 1965.000 | | | | | | | |
| | | | | | F3 | All | 943.00 | | | | | | | |
| 1 | G1 | | S2 | Sph. | All | All | 5.579 | 364.892 | 364.892 | Glass | 755523 | SYGH51 | OHARA | 57.00 |
| | | | S3 | Sph. | All | All | 0.450 | 84.772 | 84.772 | Air | | | | 50.11 |
| 2 | G1 | | S4 | Sph. | All | All | 11.657 | 79.239 | 79.239 | Glass | 805254 | SF6 | SCHOTT | 49.83 |
| | | | S5 | Sph. | F1 | All | 39.560 | 105.024 | 105.024 | Air | | | | 47.52 |
| | | | | | F2 | All | 30.907 | | | | | | | |
| | | | | | F3 | All | 22.175 | | | | | | | |
| 3 | G1 | SG11 | S6 | Sph. | All | All | 6.899 | −585.944 | −585.944 | Glass | 805254 | SF6 | SCHOTT | 42.75 |
| 4 | G1 | SG11 | S7 | Sph. | All | All | 4.873 | −303.627 | −303.627 | Glass | 497816 | SFPL51 | OHARA | 41.81 |
| | | | S8 | Sph. | All | All | 5.832 | 495.133 | 495.133 | Air | | | | 39.59 |
| 5 | G1 | SG11 | S9 | Sph. | All | All | 4.517 | −261.296 | −261.296 | Glass | 618634 | SPHM52 | OHARA | 39.18 |
| | | | S10 | Plano | F1 | All | 11.045 | Flat | Flat | Air | | | | 38.28 |
| | | | | | F2 | All | 19.697 | | | | | | | |
| | | | | | F3 | All | 28.430 | | | | | | | |
| 6 | G2 | | S11 | X Cyl. | All | All | 4.337 | Flat | −82.662 | Glass | 497816 | SFPL51 | OHARA | 32.83 |
| | | | S12 | X Cyl. | All | All | 9.184 | Flat | 70.673 | Air | | | | 32.43 |
| 7 | G2 | | S13 | X Cyl. | All | All | 4.249 | Flat | −75.084 | Glass | 497816 | SFPL51 | OHARA | 32.42 |
| | | | S14 | Plano | All | All | 1.385 | Flat | Flat | Air | | | | 32.65 |
| 8 | G2 | | S15 | Y Cyl. | All | All | 4.959 | −908.544 | Flat | Glass | 805254 | SF6 | SCHOTT | 32.70 |
| | | | S16 | Y Cyl. | All | All | 4.334 | 928.220 | Flat | Air | | | | 32.95 |
| 9 | G2 | | S17 | X Cyl. | All | All | 14.948 | Flat | 263.078 | Glass | 773.496 | SLAH66 | OHARA | 33.41 |
| | | | S18 | X Cyl. | All | All | 4.367 | Flat | −88.994 | Air | | | | 33.90 |
| 10 | G2 | | S19 | Y Cyl. | All | All | 11.981 | 246.798 | Flat | Glass | 694.508 | SLAL58 | OHARA | 35.18 |
| | | | S20 | Y Cyl. | All | All | 7.962 | −161.076 | Flat | Air | | | | 35.45 |
| 11 | G2 | | S21 | Y Cyl. | All | All | 27.028 | 69.953 | Flat | Glass | 487702 | SFSL5 | OHARA | 34.72 |
| | | | S22 | Y Cyl. | All | All | 15.808 | 58.918 | Flat | Air | | | | 30.15 |
| 12 | G2 | | S23 | Y Cyl. | All | All | 3.800 | −76.352 | Flat | Glass | 497816 | SFPL51 | OHARA | 30.98 |
| | | | S24 | Y Cyl. | All | All | 3.889 | −232.274 | Flat | Air | | | | 31.12 |
| 13 | G3 | | S25 | Sph. | All | All | 10.900 | 137.891 | 137.891 | Glass | 439950 | SFPL53 | OHARA | 31.53 |
| | | | S26 | Sph. | All | All | 0.519 | −214.419 | −214.419 | Air | | | | 31.55 |
| 14 | G3 | | S27 | Sph. | All | All | 3.550 | 259.088 | 259.088 | Glass | 720347 | SNBH8 | OHARA | 31.26 |
| 15 | G3 | | S28 | Sph. | All | All | 14.662 | 64.133 | 64.133 | Glass | 497816 | SFPL51 | OHARA | 30.45 |
| | | | S29 | Sph. | All | All | 0.500 | −353.262 | −353.262 | Air | | | | 30.34 |
| 16 | G3 | | S30 | Sph. | All | All | 8.144 | 97.834 | 97.834 | Glass | 439950 | SFPL53 | OHARA | 29.87 |
| | | | S31 | Sph. | All | All | 7.030 | 635.356 | 635.356 | Air | | | | 29.38 |
| | | | | Sph. | All | All | 26.780 | | | | | | | |
| | | | | | All | All | 46.204 | | | | | | | |
| | | | | | All | All | 64.237 | | | | | | | |
| | | | | | All | All | 75.329 | | | | | | | |
| 17 | G4 | SG41 | S32 | Sph. | All | All | 2.200 | −159.777 | −159.777 | Glass | 717479 | SLAM3 | OHARA | 15.48 |
| | | | S33 | Sph. | All | All | 5.133 | 58.576 | 58.576 | Air | | | | 15.01 |
| 18 | G4 | SG41 | S34 | Sph. | All | All | 2.200 | −77.157 | −77.157 | Glass | 589612 | SBAL35 | OHARA | 15.14 |
| 19 | G4 | SG41 | S35 | Sph. | All | All | 5.066 | 53.293 | 53.293 | Glass | 805254 | SF6 | SCHOTT | 15.90 |
| | | | S36 | Sph. | All | All | 43.249 | 880.564 | 880.564 | Air | | | | 16.09 |
| | | | | | All | All | 40.464 | | | | | | | |
| | | | | | All | All | 34.324 | | | | | | | |
| | | | | | All | All | 21.994 | | | | | | | |
| | | | | | All | All | 6.735 | | | | | | | |
| 20 | G4 | SG42 | S37 | Sph. | All | All | 2.800 | 180.566 | 180.566 | Glass | 801350 | SLAM66 | OHARA | 18.84 |
| | | | S38 | Sph. | All | All | 1.047 | 109.323 | 109.323 | Air | | | | 18.83 |
| 21 | G4 | SG42 | S39 | Sph. | All | All | 5.665 | 126.917 | 126.917 | Glass | 497816 | SFPL51 | OHARA | 18.95 |
| | | | S40 | Sph. | All | All | 38.886 | −118.086 | −118.086 | Air | | | | 19.06 |
| | | | | | All | All | 21.921 | | | | | | | |
| | | | | | All | All | 8.637 | | | | | | | |
| | | | | | All | All | 2.935 | | | | | | | |
| | | | | | All | All | 7.102 | | | | | | | |
| 22 | G5 | | S41 | Sph. | All | All | 6.264 | 119.224 | 119.224 | Glass | 439950 | SFPL53 | OHARA | 18.30 |
| | | | S42 | Sph. | All | All | 0.500 | −142.072 | −142.072 | Air | | | | 18.24 |
| 23 | G5 | | S43 | Sph. | All | All | 7.260 | 81.255 | 81.255 | Glass | 497816 | SFPL51 | OHARA | 18.30 |
| 24 | G5 | | S44 | Sph. | All | All | 2.600 | −93.115 | −93.115 | Glass | 750353 | SNBH51 | OHARA | 17.49 |
| | | | 545 | Sph. | All | All | 0.500 | 156.198 | 156.198 | Air | | | | 17.08 |
| 25 | G5 | | S46 | Sph. | All | All | 5.501 | 44.318 | 44.318 | Glass | 197816 | SFPL51 | OHARA | 16.91 |
| | | | S47 | Sph. | All | All | 0.500 | 160.913 | 160.913 | Air | | | | 16.40 |
| 26 | C5 | | S48 | Sph. | All | All | 3.694 | 42.727 | 42.727 | Glass | 548458 | ST1L1 | OHARA | 15.84 |
| | | | S49 | Sph. | All | All | 7.499 | 61.123 | 61.123 | Air | | | | 15.14 |
| Stop | | | S50 | Plano | All | All | 11.321 | Flat | Flat | Air | | | | 13.55 |
| 27 | G5 | | S51 | Sph. | All | All | 2.000 | 112.584 | 112.584 | Glass | 487702 | SFSL5 | OHARA | 10.20 |
| | | | S52 | Sph. | All | All | 3.094 | 26.037 | 26.037 | Air | | | | 9.93 |
| 28 | G5 | | S53 | Sph. | All | All | 2.137 | 108.389 | 108.389 | Glass | 216641 | SBSL7 | OHARA | 10.07 |
| | | | S54 | Sph. | All | All | 3.023 | 30.081 | 30.081 | Air | | | | 10.16 |

TABLE 1-continued

Optical Prescription

| Item | Sub-Group | Group | Surface No. | Shape[1] | Focus Position | Zoom Position[2,3] | Seperation (mm) | Y Radius of Curvature (mm) | X Radius of Curvature (mm) | Type | Code | Name[4] | Supplier[5] | Aperture[6] Half Diameter (mm) |
|---|---|---|---|---|---|---|---|---|---|---|---|---|---|---|
| 29 | G5 | | S55 | Sph. | All | All | 3.457 | 168.931 | 168.931 | Glass | 487702 | SFSL5 | OHARA | 10.54 |
| | | | S56 | Sph. | All | All | 16.389 | −53.194 | −53.194 | Air | | | | 10.84 |
| 30 | G5 | | S57 | Sph. | All | All | 3.904 | 34.718 | 34.718 | Glass | 805254 | SF6 | SCHOTT | 13.24 |
| | | | S58 | Sph. | All | All | 37.175 | 44.308 | 44.308 | Air | | | | 12.90 |
| Image | | | S59 | Y & X Cyl. | F1 | Z1 | 463.940 | 1029.861 | | Air | | | | |
| | | | | Y & X Cyl. | F2 | Z1 | 390.380 | −2461.934 | | | | | | |
| | | | | Y & X Cyl. | F3 | Z1 | 337.004 | −589.389 | | | | | | |
| | | | | Y & X Cyl. | F1 | Z2 | 350.000 | 728.306 | | | | | | |
| | | | | Y & X Cyl. | F2 | Z2 | 315.862 | −22158.909 | | | | | | |
| | | | | Y & X Cyl. | F3 | Z2 | 300.000 | −1266.833 | | | | | | |
| | | | | Y & X Cyl. | F1 | Z3 | 331.907 | 984.085 | | | | | | |
| | | | | Y & X Cyl. | F2 | Z3 | 320.000 | Flat | | | | | | |
| | | | | Y & X Cyl. | F3 | Z3 | 300.000 | −2186.394 | | | | | | |
| | | | | Y & X Cyl. | F1 | Z4 | 437.714 | −6078.194 | | | | | | |
| | | | | Y & X Cyl. | F2 | Z4 | 388.741 | −903.184 | | | | | | |
| | | | | Y & X Cyl. | F3 | Z4 | 294.968 | −696.366 | | | | | | |
| | | | | Y & X Cyl. | F1 | Z5 | 816.007 | −2031.177 | | | | | | |
| | | | | Y & X Cyl. | F2 | Z5 | Flat | Flat | | | | | | |
| | | | | Y & X Cyl. | F3 | Z5 | 550.000 | −1039.893 | | | | | | |

Notes:-
[1] In the Surface Shape column the image surface is not flat to simulate equivalent curved object surfaces through focus distance positions F1, F2 and F3 and zoom positions Z1, Z2, Z3, Z4 and Z5.
[2] Paraxial focal lengths in the Y-direction at F1 focus position for zoom positions Z1, Z2, Z3, Z4 and Z5 respectively are 40.01 mm, 51.00 mm, 67.98 mm, 95.45 mm and 125.01 mm.
[3] Paraxil focal lengths in the Y-direction at F1 focus position for zoom positions Z1, Z2, Z3, Z4 and Z5 respectively are 20.57 mm, 26.21 mm, 34.94 mm, 49.06 mm and 64.27 mm.
[4] In the Material Name column the trade name of the lens material used is given.
[5] In the Material Supplier column a manufacturer name is given although there may be alternative manufacturers.
[6] The data given in the Aperture Half Diameter column is for circular apertures.

TABLE 2

Focal Length, Anamorphic Squeeze, Illumination and Breathing

| Zoom Position | Focus Position | Paraxial Effective Focal Length | | Anamorphic Squeeze Ratio[1] | Relative Illumination[2] (%) | Breathing[3] |
|---|---|---|---|---|---|---|
| | | Y Direction (mm) | X Direction (mm) | | | |
| Z1 | F1 | 40.01 | 20.57 | 1.946 | 30.1 | 0.0 |
| | 11 | 40.16 | 20.29 | 1.980 | 30.9 | +0.4 |
| | F3 | 40.33 | 20.04 | 2.013 | 30.8 | +0.8 |
| Z3 | F1 | 61.98 | 34.94 | 1.946 | 30.1 | 0.0 |
| | F2 | 68.65 | 34.52 | 1.989 | 30.1 | +1.0 |
| | F3 | 69.35 | 34.15 | 2.031 | 30.1 | +2.0 |
| Z5 | F1 | 125.01 | 64.27 | 1.945 | 30.6 | 0.0 |
| | F2 | 123.15 | 63.09 | 1.052 | 30.6 | −1.5 |
| | F3 | 121.43 | 62.03 | 1.958 | 30.6 | −2.8 |

[1] Based on paraxial focal length in Y direction divided by paraxial focal length in X direction.
[2] At maximum radial image distance from the optical axis which is at the corner of the image,
[3] Based on the percentage difference between the paraxial effective focal length in the Y-direction at focus position F1 and foam positions F2 and F3.

| FIELD POSITION | | | | | | | | | | |
|---|---|---|---|---|---|---|---|---|---|---|
| Image Height | | Normalized Image Height | | | | | | | | |
| X-direction (mm) | Y-direction (mm) | X-direction (mm) | Y-direction (mm) | FOCUS POSITIONS (F) AND ZOOM POSITIONS (Z) | | | | | | PERFORMANCE DATA |
| | | | | F1, Z1 | F3, Z1 | F2, Z3 | Z1, Z5 | F2, Z5 | F3, Z5 | Description |
| 0 (Axial) | 0 | 0 (Axial) | 0 | 91.0 (R) 92.2 (T) | 90.9 (R) 92.1 (T) | 89.7 (R) 92.6 (T) | 74.7 (R) 64.2 (T) | 75.4 (R) 72.1 (T) | 78.2 (R) 73.1 (T) | Polychromatic diffraction MTF data (%) |
| 0 (Top of Field) | 8.91 | 0 (Top of Field) | 1 | 87.1 (R) 72.5 (T) | 89.9 (R) 69.3 (T) | 89.5 (R) 75.7 (T) | 82.2 (R) 78.8 (T) | 59.8 (R) 74.4 (T) | 79.8 (R) 69.2 (T) | at 20 cycles/mm at image surfaces and at the following |
| 10.65 (Side of Field) | 0 | 1 (Side of Field) | 0 | 63.5 (R) 85.9 (T) | 67.1 (R) 88.3 (T) | 64.5 (R) 82.6 (T) | 57.6 (R) 53.4 (T) | 54.2 (R) 65.7 (T) | 65.8 (R) 80.7 (T) | wavelengths 656.3, 587.6, 546.1, 486.1 and 455.0 |
| 7.47 70% Corner to Field | 6.24 | 0.7 70% Corner of Field | 0.7 | 74.2 (R) 78.6 (T) | 74.7 (R) 78.6 (T) | 81.1 (R) 83.9 (T) | 80.0 (R) 64.7 (T) | 82.3 (R) 75.3 (T) | 79.6 (R) 77.4 (T) | nanometers with respective weightings 7, 8, 9, 7 and 4, |
| 10.65 (Corner of Field) | 8.91 | 1 (Corner of Field) | 1 | 67.1 (R) 75.3 (T) | 66.1 (R) 74.8 (T) | 57.6 (R) 78.1 (T) | 53.1 (R) 54.0 (T) | 63.5 (R) 62.1 (T) | 71.7 (R) 62.9 (T) | where (R) = radial and (T) = tangential azimuths |

What is claimed is:

1. An anamorphic objective zoom lens comprising along an optical axis and in order from an object space to an image space: a negative (−) power spherical first lens group; an anamorphic second, lens group; a spherical third lens group, a zoom fourth lens group, a positive (+) power spherical fifth lens group and an aperture stop; wherein said aperture stop is located in a position selected from one of the following locations: before, after and within said spherical fifth lens group.

2. The anamorphic objective zoom lens group of claim 1 wherein said spherical third lens is a positive (+) power spherical third lens group.

3. The anamorphic objective zoom lens of claim 1 wherein said aperture stop is located within said positive (+) power spherical fifth lens group.

4. The anamorphic objective zoom lens of claim 1, wherein said negative (−) power spherical first lens group is configured to provide focusing.

5. The anamorphic objective zoom lens of claim 1 having a focal length within the range of from at least 35 mm to 140 mm in the Y direction.

6. The anamorphic objective zoom lens of claim 1 having a focal length within the range of 40 mm to 125 mm in the Y direction.

7. The anamorphic objective zoom lens group of claim 1 wherein said spherical third lens is a negative (−) power spherical second lens group.

8. The anamorphic objective zoom lens of claim 1 wherein said anamorphic second lens group has at least one cylindrical surface in a first direction and at least one cylindrical surface in a direction substantially perpendicular to said first direction.

9. The anamorphic objective zoom lens of claim 1 wherein said anamorphic second lens group has focal lengths in the X and Y directions which differ by a ratio of about two times.

10. The anamorphic objective zoom lens of claim 1 providing low residual chromatic aberration.

11. The anamorphic objective zoom lens of claim 1 providing a traditional oval bokeh shape.

12. The anamorphic objective zoom lens of claim 1 providing different depths of field in the vertical and horizontal azimuth directions for points within of the field of view.

13. The anamorphic objective zoom lens of claim 1 having a medium fast full aperture and moderately wide angle to moderately narrow fields of view.

14. The anamorphic objective zoom lens of claim 1 wherein said lens groups are fabricated of lens elements made of glass.

15. The anamorphic objective zoom lens of claim 1 wherein said spherical lens groups each comprise a lens element with a rotationally symmetrical surface shape about said optical axis.

16. The anamorphic objective zoom lens of claim 1 wherein said anamorphic second lens group comprises a lens element with a non-rotationally symmetrical surface about said optical axis.

17. The anamorphic objective zoom lens of claim 1 which operates at an aperture of f/3.1 and over a waveband of 455-656 nm.

18. The anamorphic objective zoom lens of claim 1 wherein said anamorphic second lens group comprises seven cylindrically surfaced lens elements with eight Y cylinders, five X cylinders and one plano surface shapes.

19. The anamorphic objective zoom lens of claim 1 wherein said spherical first lens group comprises five lens elements, three of which are axially moveable relative to the other.

20. The anamorphic objective zoom lens of claim 1 wherein said spherical third lens group comprises four lens elements.

21. The anamorphic objective zoom lens of claim 1 wherein said spherical fifth lens group comprises nine lens elements.

22. The anamorphic objective zoom lens of claim 1 wherein said zoom fourth lens group comprises five lens elements.

23. The anamorphic objective zoom lens of claim 1 wherein said zoom fourth lens group comprises two lens sub groups having three lens elements and two lens elements, of which both are axially moveable.

24. An anamorphic objective zoom lens comprising along an optical axis extending from an object space to an image space: a spherical lens group adjacent the object space; a spherical lens group adjacent the image space; an anamorphic lens group located between said spherical lens group adjacent the object space and said spherical lens group adjacent the image space; a zoom lens group and an aperture stop.

25. The anamorphic objective zoom lens of claim 24 further comprising an additional spherical lens group situated between said anamorphic lens group and said spherical lens group adjacent the image space.

26. The anamorphic objective zoom lens of claim 24 further comprising an additional spherical lens group situated between said anamorphic lens group and said zoom lens group.

27. The anamorphic objective zoom lens of claim 26 wherein a spherical lens group adjacent the object space has a negative (−) power and said additional spherical lens group has a positive (+) power.

28. The anamorphic objective zoom lens of claim 26 wherein said additional spherical lens group has a positive (+) power and said spherical lens group adjacent the image space has a positive (+) power.

29. The anamorphic objective zoom lens of claim 24 wherein said anamorphic lens group comprises at least one cylindrical surface in a first direction and at least one cylindrical surface in a direction substantially perpendicular to said first direction.

30. The anamorphic objective zoom lens of claim 24 wherein said anamorphic lens group comprises at least one cylindrical surface in an X direction and at least one cylindrical surface in a Y direction.

\* \* \* \* \*